(No Model.)

C. H. CURTIS & C. E. ATWATER.
LAWN MOWER.

No. 594,067. Patented Nov. 23, 1897.

WITNESSES
H. A. Lamb
S. V. Richardson

INVENTORS
Charles H. Curtis
Charles E. Atwater
By A. M. Wooster Atty.

UNITED STATES PATENT OFFICE.

CHARLES H. CURTIS, OF DERBY, AND CHARLES E. ATWATER, OF NEW HAVEN, CONNECTICUT.

LAWN-MOWER.

SPECIFICATION forming part of Letters Patent No. 594,067, dated November 23, 1897.

Application filed May 8, 1896. Serial No. 590,677. (No model.)

*To all whom it may concern:*

Be it known that we, CHARLES H. CURTIS, residing at Derby, and CHARLES E. ATWATER, residing at New Haven, in the county of New Haven, State of Connecticut, citizens of the United States, have invented certain new and useful Improvements in Lawn-Mowers; and we do hereby declare the following to be a full, clear, and exact description of the invention, such as will enable others skilled in the art to which it appertains to make and use the same.

Our invention has for its object to provide a simple, inexpensive, light-running, and durable machine of this character which may be driven either by hand-power or horse-power, will not clog, will be adapted to cut either light and tender grass or tall or dried grass, and which shall be so constructed that the guard-plates and the cutter-plate may be readily tilted so as to pass over stones or rough places in a lawn or be lowered to cut close to the ground or to cut grass that has been trodden down without stopping the machine or without lifting any portion of it.

With these ends in view we have devised the novel construction of which the following description, in connection with the accompanying drawings, is a specification, numbers being used to designate the several parts.

Figure 1:
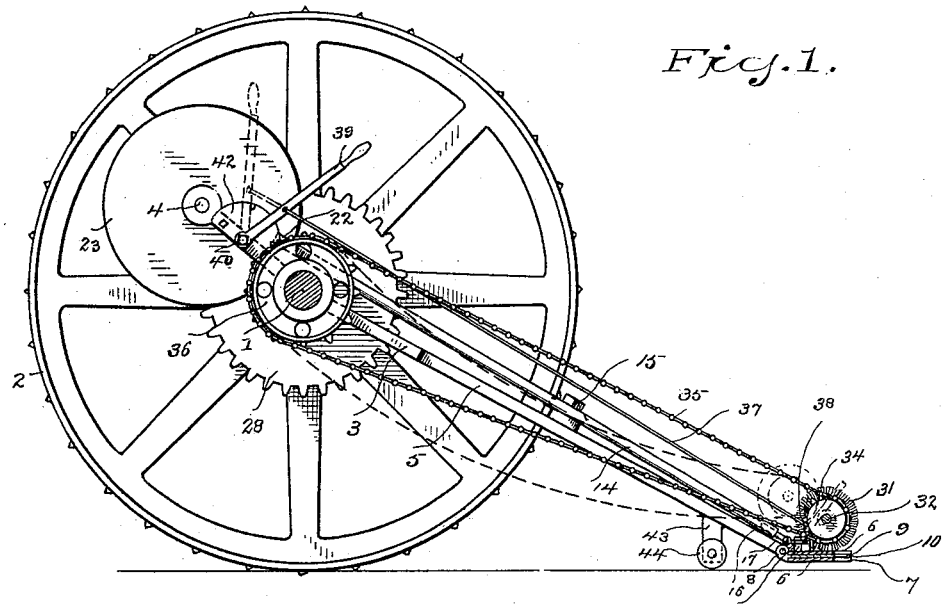
Figure 2:
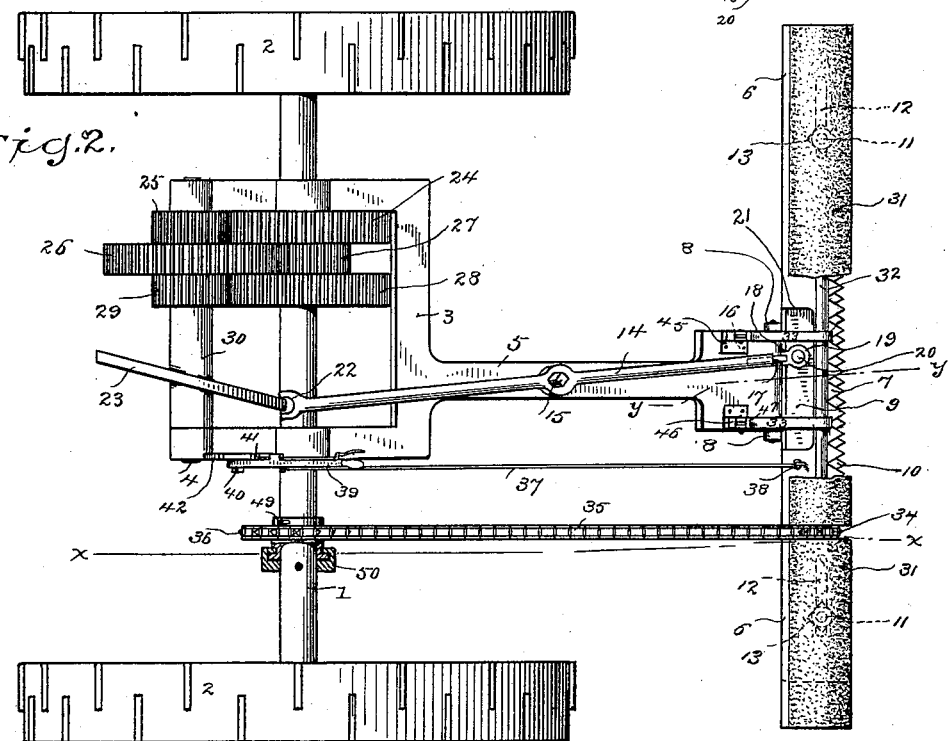
Figure 3:

Figure 1 is a section on the line *x x* in Fig. 2. Fig. 2 is a plan view, the central portion of the brush being broken away. Fig. 3 is a sectional view, on an enlarged scale, on the line *y y* in Fig. 2, illustrating the connection of the lever to the cutter-plate.

1 denotes the shaft; 2, driving-wheels attached thereto; 3, a frame in which the shaft is journaled, and at the rear of which we place a fixed shaft 4, and 5 an arm which extends forward from the frame and may or may not be made integral therewith. At the forward end of this arm we hinge the two guard-plates 6, each of which is provided at its forward end with guard-teeth 7. The special manner in which the guard-plates are hinged to arm 5 is of course not of the essence of our invention. We have shown the lower guard-plate as provided with ears 8, which are pivoted to the forward end of the arm, as clearly shown in Fig. 2. Lying between the guard-plates where it is free to reciprocate is the cutter-plate 9, which is provided with the usual cutting-teeth 10. The cutter-plate is held in position between the guard-plates in any suitable manner, as by bolts 11, which pass through slots 12 in the cutter-plate.

13 denotes nuts which engage the bolts above the upper guard-plate and retain the parts in place, said bolts, slots, and nuts appearing only in dotted lines in Fig. 2.

Reciprocatory motion is imparted to the cutter-plate by means of a lever 14, which is pivoted to arm 5, as at 15. At the forward end of lever 14 is a socket 16, which receives a rod 17, which is itself pivoted, as at 18, to a plate or head 19, the latter being provided with a hole to receive a stud 20, extending upward from the cutter-plate. The upper guard-plate is cut away, as at 21, so as to permit free movement of plate 19 and the stud.

In use rod 17 reciprocates freely in socket 16 when the lever is oscillated to reciprocate the cutter-plate, and pivot 18 will permit the guard-plates and cutter-plate to be raised or lowered relatively to arm 5, as in passing over an obstruction on a lawn, without stopping the movement of the cutter-plate or raising the arm. This construction provides an extensible jointed lever or rod for operating the cutter-plate, the rod 17 being practically an extension of the lever 14, that is movable in and out of the socket, and the plate 19 being practically an operative portion of the lever, the pivot 18 being the joint. The lever may be oscillated in any suitable manner. In the present instance we have shown a yoke 22 at the rear end of said lever, which receives the edge of a cam 23, mounted on the fixed shaft. The special means by which motion is communicated from the driving-shaft to said cam is, of course, not of the essence of our invention. The mechanism which we have shown in the drawings is found to be perfectly satisfactory for that purpose.

24 denotes a gear-wheel which is fixed to driving-shaft 1 and meshes with a pinion 25, which turns on the fixed shaft. Fixed to this pinion and likewise turning on the fixed shaft is a gear-wheel 26, which meshes with a pinion 27, which turns on the driving-shaft. Fixed to pinion 27 and likewise turning on the driving-shaft is a gear-wheel 28, which meshes with a pinion 29, carried by a sleeve 30, which turns on the fixed shaft and carries cam 23. It will thus be seen that rotary movement of the driving-shaft when the machine is in use will be communicated to sleeve 30 and the cam, which will oscillate lever 14 and reciprocate the cutter-plate.

31 denotes a rotary brush whose shaft 32 is journaled in swinging arms 33, which are pivoted to brackets 45 upon arm 5.

46 denotes lugs upon the brackets, and 47 lugs upon the arms, which serve as stops to limit the backward movement of the arms when the brush is thrown out of operative position.

48 denotes rests which extend downward from arms 33 and the ends of which rest upon the upper guard-plate and support the rotary brush in its operative position. Shaft 32 also carries a sprocket-wheel 34, which receives motion by means of a sprocket-chain 35, running over a sprocket-wheel 36 on the driving-shaft. The action of this brush is to bring the grass up to the cutters and keep the guard-teeth and cutting-teeth clear by brushing away the severed grass. In cutting either high or tangled grass the brush may be turned backward out of operative position, in which position it is supported by the engagement of lugs 47 on arms 33 with the lugs 46 on brackets 45. When the brush is out of operative position, sprocket-wheel 36 on the driving-shaft may be disconnected from the shaft by the removal of a key 49. (See Fig. 2.) The removal of this key leaves the shaft free to rotate without imparting rotary movement to the sprocket-wheel, and consequently leaves the brush inoperative.

50 denotes a collar which is rigidly secured to the shaft and acts to hold sprocket-wheel 36 against longitudinal movement on the shaft.

37 denotes a lifting-rod the forward end of which is loosely connected to the upper guard-plate, as at 38, and the rear end of which is loosely connected to a lever 39, which is pivoted to the frame, as at 40, and is provided with a latch 41, adapted to engage notches in a segment-plate 42, which is rigidly secured to the frame to lock the guard-plates and cutter-plate at any position in which they may be placed.

43 denotes a bracket extending downward from arm 5 and carrying a roller 44, which travels on the ground and upon which the weight of the guard-plates, cutter-plate, &c., rests.

It will of course be readily understood from Fig. 3 that when the cutter-plate and the guard-plates are tilted by means of rod 37 the brush will also be lifted through the engagement of rests 48 with the upper guard-plate, and that as soon as the guard-plates and cutter-plates are lowered to operative position the brush also will drop back to its normal position.

We have not shown the thills, pole, or driving-handle for the reason that the special means by which the machine is propelled forms no portion of our present invention.

Having thus described our invention, we claim—

1. In a lawn-mower the combination with a frame having a forwardly-extending arm, of guard-plates hinged to said arm, a cutter-plate lying between the guard-plates and having stud 20, a lever 14 having a socket at its lower end, a plate 19 fitting over the stud 20, a rod 17 pivoted to plate 19 and adapted to slide in the socket, means for oscillating the lever and reciprocating the cutter-plate and means for tilting the guard-plates and cutter-plate in the vertical plane independently of the arm and without interrupting the action of the machine, or altering the elevation of the arm.

2. In a lawn-mower the combination with a frame having a forwardly-extending arm, of guard-plates hinged to said arm, a cutter-plate lying between the guard-plates, lever 14 pivoted to the arm and having an extensible and jointed lower end connected with the cutter-plate which will permit the guard-plates and cutter-plate to be tilted without lifting the arm, means for oscillating said lever and reciprocating the cutter-plate a bracket depending from said arm and carrying a roller upon which the weight of the guard-plates and cutter-plate rests, and means for tilting the guard and cutter plates relatively to the arm without interrupting the action of the machine.

3. The combination with the shaft, a frame in which said shaft is journaled and which is provided with an arm 5, a fixed shaft at the rear of the frame and a cam mounted on said shaft, of guard-plates hinged to the arm, a cutter-plate lying between the guard-plates, lever 14 pivoted to the frame, the lower end of said lever being jointed and extensible and connected to the cutter-plate and the other provided with a yoke which engages the cam, means for transmitting motion from the shaft to the cam whereby the cutter-plate is reciprocated in use, and means for tilting the guard and cutter plates relatively to the arm without interrupting the action of the machine.

4. The combination with the shaft, a frame in which the shaft is journaled and which is provided with an arm 5, a fixed shaft at the rear of the frame, and a cam mounted on said shaft, of guard-plates hinged to the arm, a cutter-plate lying between the guard-plates, lever 14 pivoted to the frame, the lower end of said lever being jointed and extensible and connected to the cutter-plate and the other provided with a yoke which engages the cam, means for transmitting motion from the shaft to the cam, a roller at the forward end of the arm upon which the weight rests and means as lifting-rod 37 for raising or lowering the guard-plates and cutter-plate independently of the arm and without interrupting the action of the machine.

5. The combination with the shaft, a frame in which the shaft is journaled and an arm 5 extending forward from the frame, of guard-plates hinged to the arm, a cutter-plate lying between the guard-plates, a rotary brush journaled in swinging arms 33 and mechanism intermediate the shaft and guard-plates for rotating the brush and for reciprocating the cutter-plate, the guard-plates, cutter-plate and brush being free to tilt vertically independently of the arm.

6. In a lawn-mower the combination with an arm 5, guard-plates hinged to said arm so as to tilt in the vertical plane, a cutter-plate between said guard-plates, means for reciprocating the cutter-plate and means for tilting the guard-plates and cutter-plate independently of the arm, of arms 33 pivoted to arm 5, a brush journaled in arms 33, rests 48 extending downward from said arms and bearing on the upper guard-plate to support the brush and means for rotating the brush.

7. In a lawn-mower the combination with an arm 5, guard-plates hinged to said arm so as to tilt in the vertical plane, and a cutter-plate between said guard-plates, of arms 33 pivoted to arm 5, a brush journaled in arms 33, sprocket-wheels and a sprocket-chain by which the brush is rotated.

8. In a lawn-mower the combination with an arm 5, guard-plates hinged to said arm so as to tilt in the vertical plane and a cutter-plate between said guard-plates, of arms 33 pivoted to arm 5, a brush journaled in arms 33, sprocket-wheels and a sprocket-chain by which the brush is rotated, stops for supporting arms 33 and the brush when out of operative position and means for disconnecting the driving-sprocket so that the brush will not rotate.

In testimony whereof we affix our signatures in presence of two witnesses.

CHARLES H. CURTIS.
CHARLES E. ATWATER.

Witnesses:
WM. M. CURTISS,
JOHN N. SINSABAUGH.